No. 739,593.　　　　　　　　　　　　　　　　　　Patented September 22, 1903.

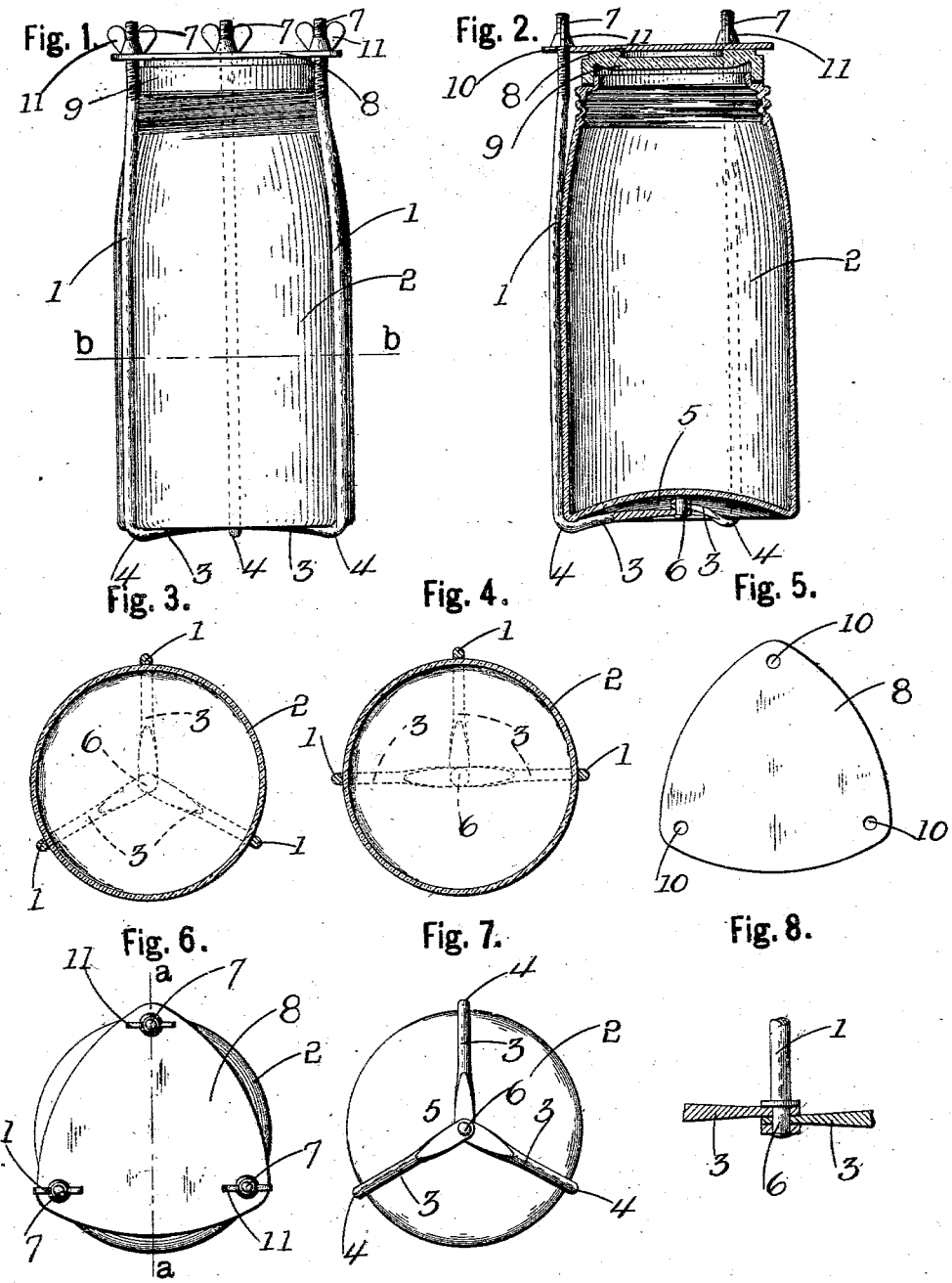

UNITED STATES PATENT OFFICE.

GEORGE B. ERTELL, OF BUFFALO, NEW YORK, ASSIGNOR OF ONE-HALF TO FRED E. GOODMAN, OF BUFFALO, NEW YORK.

DEVICE FOR CLOSING OR FASTENING FRUIT CANS OR JARS OR THE LIKE.

SPECIFICATION forming part of Letters Patent No. 739,593, dated September 22, 1903.

Application filed June 15, 1903. Serial No. 161,510. (No model.)

*To all whom it may concern:*

Be it known that I, GEORGE B. ERTELL, a citizen of the United States, residing at Buffalo, in the county of Erie and State of New York, have invented certain new and useful Improvements in Devices for Closing or Fastening Fruit Cans or Jars or the Like, of which the following is a specification.

This invention relates to a device for closing or fastening fruit cans or jars or the like; and it consists of a series of rods or arms bent at an angle at one end and pivoted together at their inner extremities and a plate attached at the other end through which the rods or arms are passed and fastened.

The object of the invention is to provide a fastening device that is simple of construction, easily and efficiently operated, and which can be quickly applied to and removed from the jar.

It also relates to certain details of construction, all of which will be fully and clearly hereinafter described and claimed, reference being had to the accompanying drawings, in which—

Figure 1 represents a side elevation of the device with a jar placed therein. Fig. 2 is a section on line *a a*, Fig. 6. Fig. 3 is a section on line *b b*, Fig. 1. Fig. 4 is a section on line *b b*, Fig. 1, showing the rods in separated position for removing the jar in dotted lines. Fig. 5 represents the triangular plate. Fig. 6 is a top plan view of the jar. Fig. 7 is a bottom plan view of the jar. Fig. 8 is a detailed view of the pivotal connection of the fastening-rods.

In referring to the drawings in detail like numerals designate like parts.

The fastener is preferably formed of a series of rods 1, preferably three in number, extending longitudinally on the exterior of the can or jar 2 and having their lower ends 3 bent at an angle 4, as shown, to fit around the bottom of the jar. The inner ends 3 of the rods are bent to the form of the concavity 5 in the bottom of the jar, so that the ends fit in said concavity when the device is screwed tightly upon the can. The angle 4 forms angular-shaped ends on which the fastener rests when in an upright position. The inner extremities of the ends 3 of the rods are flattened and are pivotally fastened together by a pivot-pin 6 to allow for movement of the rods when it is required to separate them to remove or place the jar within the fastening device. The upper ends of the rods are screw-threaded, as shown at 7, and a triangular plate 8, adapted to seat on the cover 9 of the can or jar, has openings 10 in its triangular ends through which the screw-threaded ends 7 of the rods are adapted to pass. Thumb-nuts 11 are screwed on the screw-threaded ends 7, which screw down upon the plate 8 and rigidly fasten the plate down on the cover 9.

Heretofore with the old-fashioned cans when they had to be tightly fastened for some time after the fruit or the like has been put in them it was almost impossible for a person, unless they had unusual strength, to loosen the cover of the can. It generally had to be put in boiling water upside down before the cover could be loosened and removed.

With this improved device the can or jar can be as tightly sealed as desired without much effort by screwing the thumb-nuts 11 down upon the plate 7, which presses the cover securely down upon the top of the jar, and when it is desired to open the jar the thumb-nuts can be easily unscrewed, the plate lifted a trifle, and two of the rods 1 sufficiently separated to permit the jar or can to be easily and quickly removed therefrom or placed within the fastener.

These fasteners can be made to fit any size of cans or jars.

This improved fastening device cannot only be easily attached to or detached from the can or jar, but it also by reason of the fact that the rods are located on the exterior of the can or jar serves to protect the same from blows or shocks and acts as an inclosing and strengthening cage.

I claim as my invention—

1. A device of the class described, comprising a triangular plate adapted to fit against the top cover of a jar, can or the like, and provided with a plurality of openings, a plurality of rods extending longitudinally on the exterior of the jar, can or the like and having their lower ends bent inwardly to fit around the bottom of a jar, can or the like and pivotally connected at their inner extremities and their upper ends screw-threaded and projecting through the openings in the triangular plate and fastening devices on the protruding screw-threaded upper ends of said rods, substantially as set forth.

2. In a device of the class described, a plate adapted to fit against the top cover of a jar, can or the like and having three equidistant openings, three rods having their upper ends projecting through the openings in the plate and their lower ends bent to fit around the bottom of a jar, can or the like and a pivot joining the inner extremities of said ends, substantially as set forth.

3. In a device of the class described, a cage-like structure adapted to fit around a jar, can or the like and comprising a top plate and at least three angular rods which are pivotally connected at their lower extremities and adjustably fastened to the plate, said rods being adapted to be separated to permit the introduction or removal of a jar, can or the like, substantially as set forth.

GEORGE B. ERTELL.

Witnesses:
 CHAS. BALD,
 A. H. TRACY, Jr.